S. G. SUPPLEE.
HEATING APPARATUS.
APPLICATION FILED MAY 12, 1914.
1,117,277.
Patented Nov. 17, 1914.
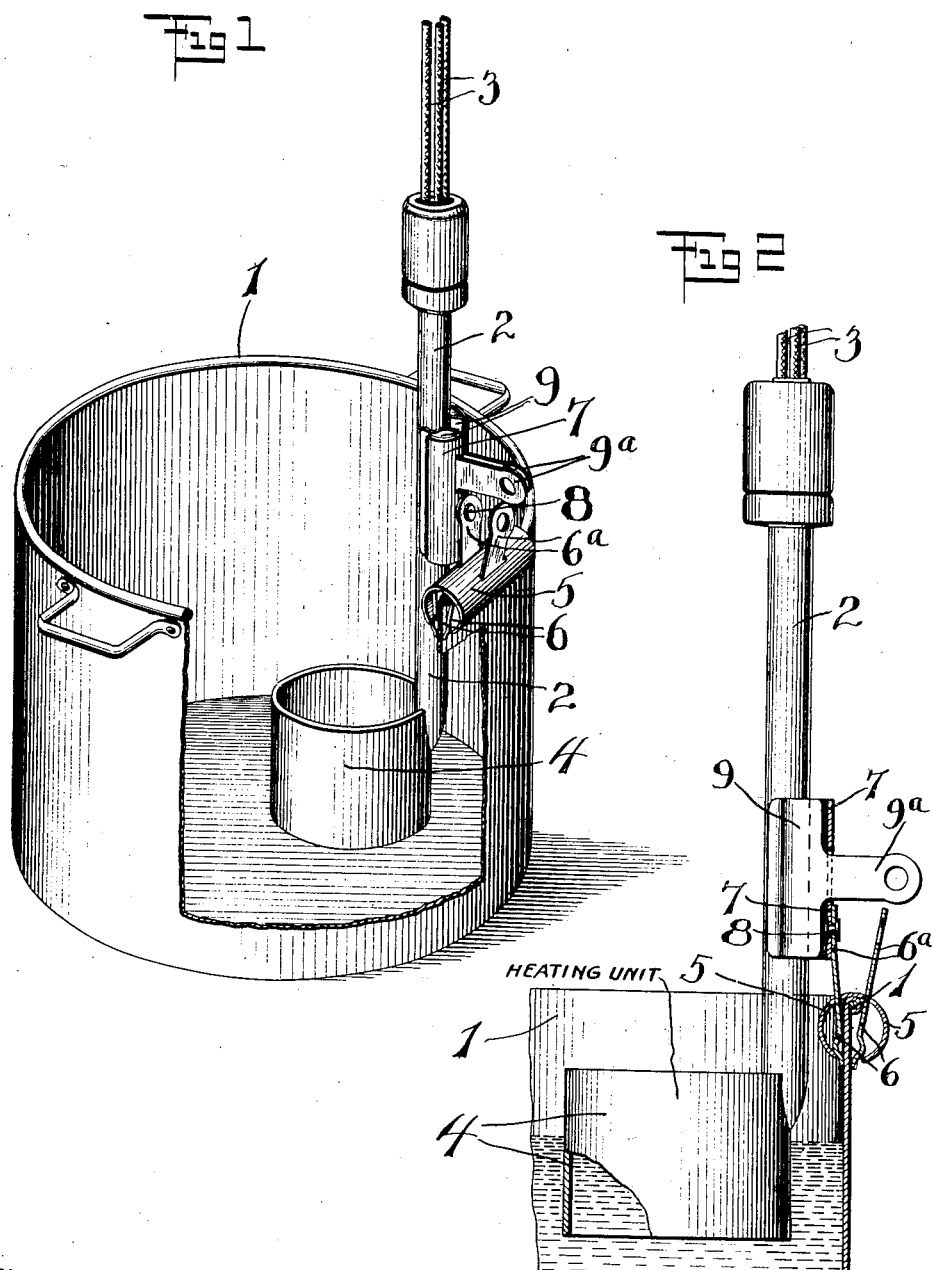
Witnesses:
C. J. Hachenberg
Ida M. Hunziker
Inventor
Samuel G. Supplee
By his Attorneys

UNITED STATES PATENT OFFICE.

SAMUEL G. SUPPLEE, OF EAST ORANGE, NEW JERSEY.

HEATING APPARATUS.

1,117,277. Specification of Letters Patent. Patented Nov. 17, 1914.

Application filed May 12, 1914. Serial No. 837,989.

*To all whom it may concern:*

Be it known that I, SAMUEL G. SUPPLEE, a citizen of the United States, residing at East Orange, Essex county, State of New Jersey, have invented certain new and useful Improvements in Heating Apparatus, of which the following is a full, clear, and exact description.

This invention relates to heating apparatus of the type designed to heat liquid in a container, and it is the special object of this invention to provide means whereby liquid may be so heated to provide, if desired, different strata of heated areas with different degrees of heat for the different strata. One instance wherein such a device is particularly desirable is the case of dental impression apparatus, wherein it is desired to keep a body of impression material in water having a definite range of temperature.

One embodiment of the invention is shown in the accompanying drawing forming part of this specification and in which—

Figure 1 is a perspective view of a liquid container with the heating element adjustably supported therewithin in accordance with the present invention, a portion of the container being broken away to disclose the interior. Fig. 2 is a fragmentary vertical sectional view on a slightly enlarged scale through said container, parts of the heating apparatus being shown in section.

Referring to the drawings by numerals, 1 indicates a suitable liquid container preferably of sheet metal and 2 the standard portion of an electric heater element, the wires 3 conveying the current to the heating element proper which in the present instance is in the form of a ring 4 providing the resistance by which heat is generated. This heating element is adjustably supported within the container 1 by suitable supporting means, one form of which is shown in the drawings. This form embodies a spring clip comprising the tubular spring member 5 within which are arranged oppositely disposed gripping arms 6 having transversely offset operating handles 6ª projecting through suitable slots formed in the tubular spring 5. It will be manifest that the spring 5 acting against the arms 6 normally forces them toward each other, and that by means of the handles 6ª the tubular spring 5 may be opened and the gripping arms 6 likewise opened to embrace therebetween the edge of the container 1, the tension of the spring 5 thereafter normally serving to hold the arms 6 in adjusted position on said container edge. One arm 6ª of the spring clip is connected, preferably rigidly, to the tubular spring 7 of a second and similarly formed clip arranged at right angles to the first and above the first, the arm 6ª being secured adjacent its upper end to the spring 7 adjacent its lower end as by means of a rivet 8 (see Fig. 2).

9 designates the gripping arms within the tubular spring 7, these arms having transversely offset operating handles 9ª projecting through suitable slots in the tubular spring 7 and positioned above the operating handle 6ª of the first clip. The arms 9 are arranged to be spread apart through these handles and against the tension of the spring 7 so as to embrace therebetween the standard 2 of the heating element, the tension of the spring 7 serving to frictionally support the standard as adjusted.

It will be seen that the parts described provide a support for the heating element which may be detachably applied to a liquid container and which at the same time will support the heating element at various distances from the base of said container. Assuming that it is desired to have the lower strata of water in the container at a lower temperature than the upper strata of water therein, the handles 9ª are operated to release the standard 2 so that the same can be positioned as indicated in Fig. 2 of the drawings with the heater element 4 adjacent the top of the water. This will provide a lower strata of water wherein impression material may be kept until needed for use. The impression material may be withdrawn from this strata and shaped as desired; then, having cooled off somewhat, may be plunged into the upper and warmer strata of water to be quickly reheated to the desired degree of plasticity for impression use. This illustrates one instance of the advantage of providing means for adjustably supporting a heater element relative to a liquid container. The convenience of having this supporting means detachable from the container is obvious. The specific structure I employ is one which offers a simple and convenient means for attaining the ends desired, but it will be obvious that variations in the structure of this supporting means may be necessary for different types of heating elements and containers, and that such modification is within the spirit of the present invention.

What I claim is:

1. In a device of the character described, a liquid container, a heating element arranged to be inserted within said container; and supporting means arranged to engage and be supported upon said container and itself arranged to engage and adjustably support said heating element relative to said container.

2. In a device of the character described, a liquid container, a heating element arranged to be inserted within said container, and supporting means arranged to detachably engage and be supported upon said container, and itself arranged to engage and adjustably support said heating element relative to said container.

3. In a device of the character described, a heating element including a heat radiating portion and a supporting standard therefor, and means for supporting said element with its heating portion within said container, said means including a support arranged for supporting engagement with said container and having a clasp element for engaging and holding said heater standard with its heat radiating element at various positions relative to the container.

4. In a device of the character described, a heating element including a heat radiating portion and a supporting standard therefor, and means for supporting said element with its heating portion within said container, said means including a support arranged for detachable supporting engagement with said container and having a clasp element for engaging and holding said heater standard with its heat radiation element at various positions relative to the container.

SAMUEL G. SUPPLEE.

Witnesses:
HENDERSON F. HILL,
R. C. MITCHELL.